US010020575B2

(12) United States Patent
Jo et al.

(10) Patent No.: US 10,020,575 B2
(45) Date of Patent: Jul. 10, 2018

(54) APPARATUS AND METHOD FOR CONTROLLING STABILIZATION OF SATELLITE-TRACKING ANTENNA (71) Applicant: AGENCY FOR DEFENSE DEVELOPMENT, Daejeon (KR)

(72) Inventors: Hyun-Wook Jo, Andong-si (KR); Jong-Wan Heo, Daejeon (KR); Myung-Jin Jang, Incheon (KR); Kun-Sup Kwon, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 15/665,815

(22) Filed: Aug. 1, 2017

(65) Prior Publication Data
US 2018/0048062 A1 Feb. 15, 2018

(30) Foreign Application Priority Data

Aug. 10, 2016 (KR) ........................ 10-2016-0101635

(51) Int. Cl.
| *H01Q 3/00* | (2006.01) |
| *H01Q 19/12* | (2006.01) |
| *H01Q 3/02* | (2006.01) |
| *G01S 7/40* | (2006.01) |
| *H01Q 3/08* | (2006.01) |
| *G01S 3/38* | (2006.01) |
| *G01S 3/42* | (2006.01) |
| *H01Q 1/12* | (2006.01) |
| *H01Q 19/19* | (2006.01) |

(52) U.S. Cl.
CPC ............... *H01Q 3/08* (2013.01); *G01S 3/38* (2013.01); *G01S 3/42* (2013.01); *H01Q 1/1257* (2013.01); *H01Q 19/19* (2013.01)

(58) Field of Classification Search
CPC .................................... H01Q 3/08; G01S 3/38
See application file for complete search history.

(56) References Cited

U.S. PATENT DOCUMENTS

| 6,317,093 B1 * | 11/2001 | Harris .................. G01S 3/38 343/765 |
| 2009/0315760 A1 * | 12/2009 | Mousavi Bafrooei .... G01S 3/42 342/174 |

FOREIGN PATENT DOCUMENTS

| KR | 10-2007-0043165 A | 4/2007 |
| KR | 10-0857536 B1 | 9/2008 |

* cited by examiner

*Primary Examiner* — Dameon E Levi
*Assistant Examiner* — Ricardo Magallanes
(74) *Attorney, Agent, or Firm* — LRK Patent Law Firm (57) ABSTRACT An apparatus and method for controlling stabilization of a satellite-tracking antenna, the apparatus including: an antenna driving unit driving the antenna to track a satellite based on preset satellite position information and position information collected by an inertia sensor and an encoder; a point detecting unit detecting a point where an amplitude of a satellite reception signal is maximum; an elevation measuring unit measuring an elevation value corresponding to the point; and a controller controlling an azimuth motor and an elevation motor to enable the antenna to face the point, when the measured value is out of a first range, the controller controlling the azimuth motor to have an azimuth value corresponding to the point and controlling the elevation motor to have an elevation value less than the measured value corresponding to the point, when the measured value is in the first range.

6 Claims, 5 Drawing Sheets

APPARATUS AND METHOD FOR CONTROLLING STABILIZATION OF SATELLITE-TRACKING ANTENNA

CROSS-REFERENCE TO RELATED APPLICATION

This application claims priority to Korean Patent Application No. 10-2016-0101635 filed on Aug. 10, 2016, which is incorporated herein by reference in its entirety.

BACKGROUND OF THE INVENTION

1. Technical Field

The present invention relates generally to an apparatus and method for controlling stabilization of a satellite-tracking antenna. More particularly, the present invention relates to an apparatus and method for controlling stabilization of a satellite-tracking antenna, the apparatus and method being capable of avoiding a keyhole problem, which occurs due to reduction in a degree of freedom of an antenna driving axis, by considering an azimuth and driving torque of an elevation motor, and of ensuring communication quality.

2. Description of the Related Art

Satellite communication is performed by transmitting and receiving radio signals to and from an artificial satellite. In satellite communication, installation of a base station is unnecessary, and the desired sight of communication is easily realized. Thus, importance and utilization thereof have increased rapidly in military operations as well as in civilian use. Also, for satellite communication, all platforms including stationary as well as mobile ground vehicles, trains, ships, aircrafts, etc. require communication equipment mounted thereon to track the satellite stably regardless of movement of the platforms.

An artificial satellite is far from the ground, and thus an antenna having narrow beam width and high directivity is used to track the artificial satellite for communication. For example, in the case of a biaxial antenna, an elevation of zero degrees is defined as a direction perpendicular to an azimuth motor axis. In order for the antenna to track the satellite, when a platform moves or disturbance occurs, or the artificial satellite moves, driving torque of an azimuth motor increases in proportion to 1/cos (elevation). Therefore, when the elevation is close to 90 degrees, it is difficult for the antenna to precisely face the artificial satellite. When the elevation is 90 degrees, it is impossible for the antenna to face the artificial satellite. This phenomenon is called keyhole.

That is, a conventional antenna having a biaxial pedestal structure cannot avoid keyhole problem where the elevation is 90 degrees. In contrast, when the elevation is increased equal to or greater than a particular value in order to avoid the keyhole problem, driving of the antenna may be stopped but a tracking error may increase, whereby communication quality may not be ensured.

Also, the keyhole problem occurs due to reduction in one rotational degree of freedom. The keyhole problem may be solved by increasing the number of driving motors, but the height and the volume of the antenna increase as well as power consumption and the weight. Thus, the center of gravity is high such that the stability of the platform is reduced.

SUMMARY OF THE INVENTION

Accordingly, the present invention has been made keeping in mind the above problems occurring in the related art, and an object of the present invention is to provide an apparatus and method for controlling stabilization of a satellite-tracking antenna, whereby the apparatus and method can extract an antenna position and a faced point by searching for a point where an amplitude of a satellite reception signal is the maximum, and control an azimuth motor and an elevation motor to correct an antenna position based on the extracted antenna position and faced point, whereby the point where the satellite reception signal is the maximum can be obtained.

Another object of the present invention is to provide an apparatus and method for controlling stabilization of a satellite-tracking antenna, where by the apparatus and method can adjust an azimuth value of the azimuth motor to be an azimuth value corresponding to the point where the amplitude of the satellite reception signal is the maximum and adjust a measured elevation value of the elevation motor to be less than an elevation value corresponding to the point where the amplitude of the satellite reception signal is the maximum when the measured elevation value of the antenna is equal to or greater than a preset angle through an encoder, whereby keyhole problem can be prevented.

In order to accomplish the above object, the present invention provides an apparatus for controlling stabilization of a satellite-tracking antenna, the apparatus including: an antenna driving unit driving the antenna to track a satellite based on preset satellite position information and position information collected by an inertia sensor and an encoder that are provided at the antenna; a point detecting unit detecting a point where an amplitude of a satellite reception signal of the antenna is maximum; an elevation measuring unit measuring an elevation value of the antenna corresponding to the point where the amplitude of the satellite reception signal of the antenna is maximum; and a controller controlling an azimuth motor and an elevation motor of the antenna to enable the antenna to face the point where the amplitude of the satellite reception signal is maximum, when the measured elevation value of the antenna is out of a first preset range, the controller controlling the azimuth motor of the antenna to have an azimuth value corresponding to the point where the amplitude of the satellite reception signal is maximum and controlling the elevation motor of the antenna to have an elevation value less than the measured elevation value corresponding to the point where the amplitude of the satellite reception signal is maximum, when the measured elevation value of the antenna is in the first preset range.

Also, the point detecting unit may detect the point where the amplitude of the satellite reception signal of the antenna is maximum, and the point may be a point where a tracking error is 'zero' according to an angle between a current facing direction of the antenna and a direction where the amplitude of the satellite reception signal is maximum.

Also, when a movement of the satellite is detected after the antenna faces the point where the amplitude of the satellite reception signal is maximum, the controller may generate a driving command signal for the azimuth motor based on a value obtained by adding an azimuth change value in consequence of the movement of the satellite to the azimuth value corresponding to the point.

Also, when a movement of the satellite is detected after the antenna faces the point where the amplitude of the satellite reception signal is maximum, the controller may generate a driving command signal for the elevation motor based on a value obtained by adding an elevation change value in consequence of the movement of the satellite to the measured elevation value corresponding to the point.

Also, when the movement of the satellite is detected after the antenna faces the point where the amplitude of the satellite reception signal is maximum, and the measured elevation value of the antenna is in the first preset range, and the measured elevation value is larger than a value in a second preset range that is less than 90 degrees and exceeds a value obtained by subtracting a tracking error from 90 degrees, the controller may generate the driving command signal for the elevation motor based on a value obtained by subtracting an integral value for a preset constant value from the value obtained by adding the elevation change value in consequence of the movement of the satellite to the measured elevation value corresponding to the point.

Also, when the movement of the satellite is detected after the antenna faces the point where the amplitude of the satellite reception signal is maximum, and the measured elevation value of the antenna is in the first preset range, and the measured elevation value is less than a value in a third preset range that is less than the value in the second preset range and exceeds the value obtained by subtracting the tracking error from 90 degrees, the controller may generate the driving command signal for the elevation motor based on a value obtained by subtracting an initial integral value (0) for the preset constant value from the value obtained by adding the elevation change value in consequence of the movement of the satellite to the measured elevation value corresponding to the point.

According to another aspect, there is provided a method of controlling stabilization of a satellite-tracking antenna, the method including: driving, by an antenna driving unit, the antenna to track a satellite based on preset satellite position information and position information collected by an inertia sensor and an encoder that are provided at the antenna; detecting, by a point detecting unit, a point where an amplitude of a satellite reception signal of the antenna is maximum; measuring, by an elevation measuring unit, an elevation value of the antenna corresponding to the point where the amplitude of the satellite reception signal of the antenna is maximum; controlling, by a controller, an azimuth motor and an elevation motor of the antenna to enable the antenna to face the point where the amplitude of the satellite reception signal is maximum, when the measured elevation value of the antenna is out of a first preset range; and controlling, by the controller, the azimuth motor of the antenna to have an azimuth value corresponding to the point where the amplitude of the satellite reception signal is maximum, and controlling the elevation motor of the antenna to have an elevation value less than the measured elevation value corresponding to the point where the amplitude of the satellite reception signal is maximum, when the measured elevation value of the antenna is in the first preset range.

In order to obtain the point where the satellite reception signal is the maximum, the apparatus and method for controlling stabilization of the satellite-tracking antenna according to the present invention can extract an antenna position and a faced point by searching for the point where the amplitude of the satellite reception signal is the maximum, and can control the azimuth motor and the elevation motor to correct an antenna position based on the extracted antenna position and the faced point, whereby communication quality of satellite communication can be ensured regardless of the movement of the platform and disturbance.

Also, the apparatus and method for controlling stabilization of the satellite-tracking antenna can adjust an azimuth value of the azimuth motor to be an azimuth value corresponding to the point where the amplitude of the satellite reception signal is the maximum and can adjust a measured elevation value of the elevation motor to be less than an elevation value corresponding to the point where the amplitude of the satellite reception signal is the maximum when the measured elevation value of the antenna is equal to or greater than a preset angle through the encoder, whereby keyhole problem can be prevented.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the most preferred embodiment of the present invention will be described with reference to the accompanying drawings in order to describe the present invention in detail so that the technical spirit of the present invention can be easily embodied by those skilled in the art to which the present invention belongs. First, it is to be noted that in assigning reference numerals to elements in the drawings, the same reference numerals designate the same elements throughout the drawings although the elements are shown in different drawings. In addition, in the description of the present disclosure, the detailed descriptions of known related constitutions or functions thereof may be omitted if they make the gist of the present invention unclear.

Figure 1:
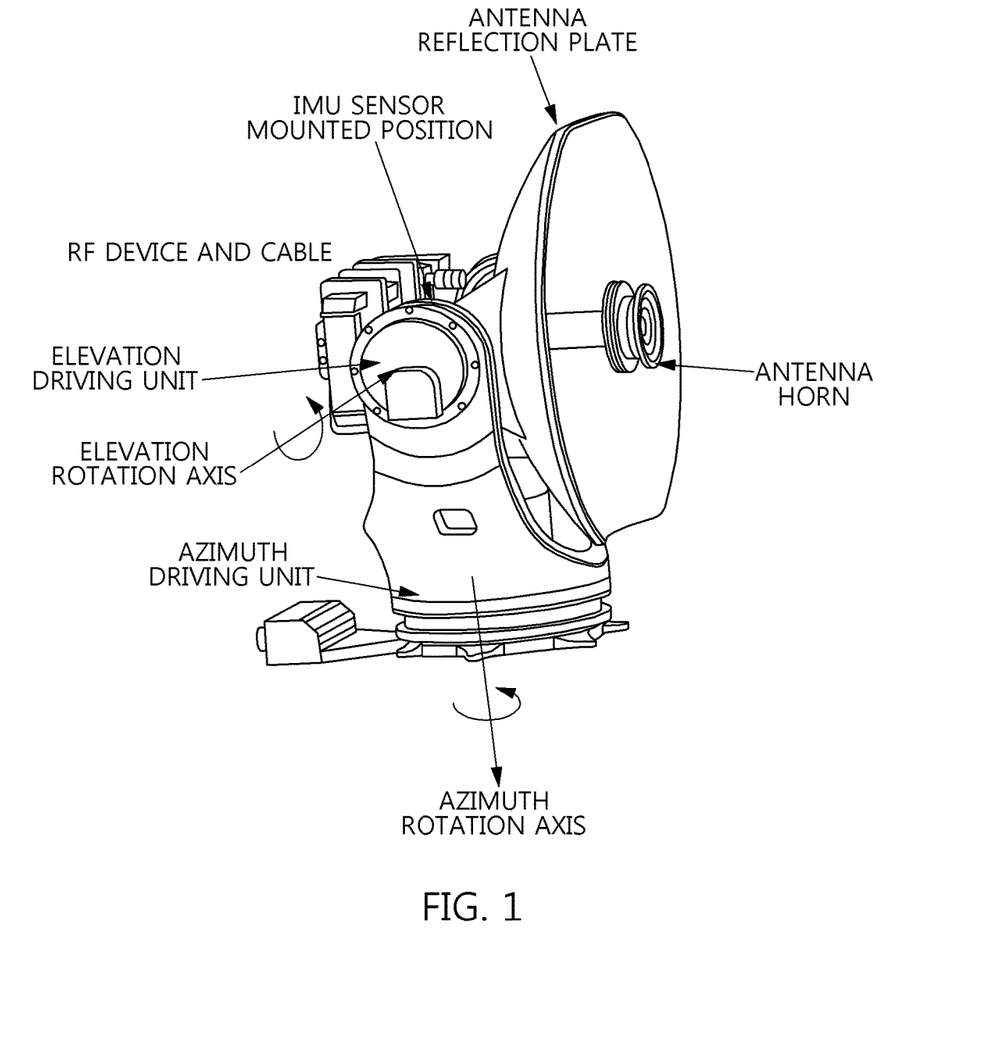
FIG. 1 is a view illustrating a satellite-tracking antenna having a biaxial pedestal structure.
Figure 2:
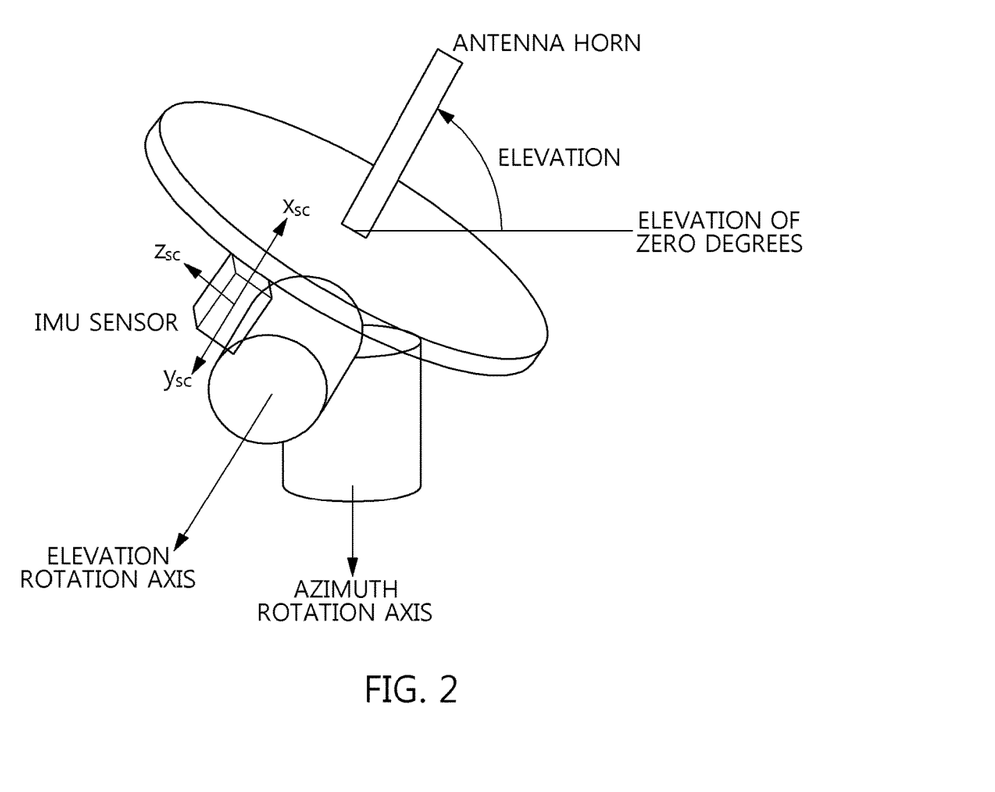
FIG. 2 is a view illustrating the concept of an elevation for the satellite-tracking antenna in FIG. 1.

FIG. 1 is a view illustrating a satellite-tracking antenna having a biaxial pedestal structure. FIG. 2 is a view illustrating the concept of an elevation for the satellite-tracking antenna in FIG. 1.

Referring to FIGS. 1 and 2, the satellite-tracking antenna according to the present invention is mounted at a platform, and includes an antenna horn, an antenna reflection plate, an inertia sensor, an RF device and a cable, an elevation driving unit, and an azimuth driving unit.

The satellite-tracking antenna mounted at the platform as described above includes the inertia sensor (an inertial measurement unit (IMU) or an inertial navigation system (INS)) behind the antenna reflection plate, and uses a gyroscope in the inertia sensor to recognize a current tracking direction.

Also, in the satellite-tracking antenna, an elevation of zero degrees is defined as a direction perpendicular to an azimuth motor axis. In order for the satellite-tracking antenna to track the satellite, when the platform moves or disturbance occurs or the satellite moves, a driving value of an azimuth motor increases in proportion to 1/cos (elevation).

Figure 3:
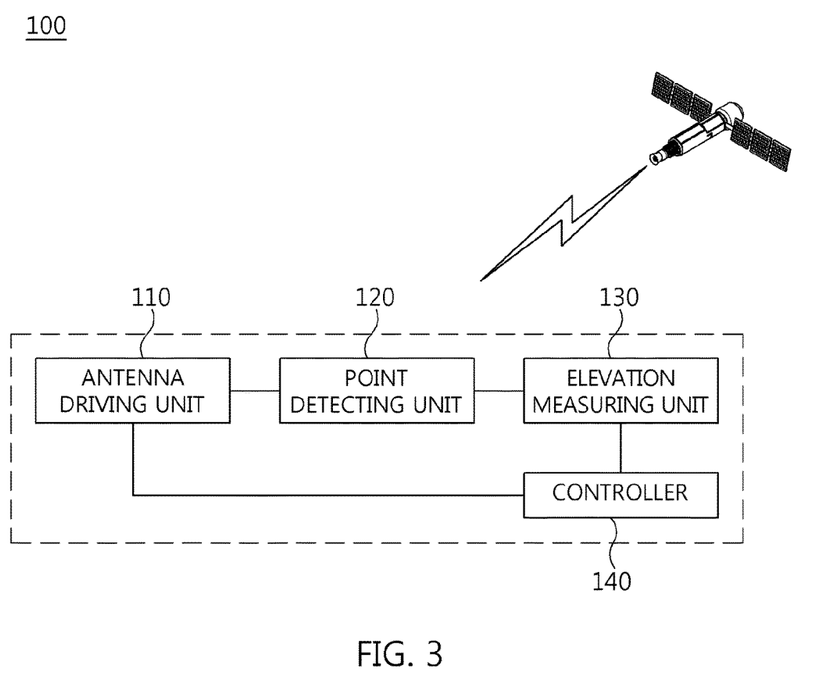
FIG. 3 is a view illustrating configuration of an apparatus for controlling stabilization of a satellite-tracking antenna according to the present invention.

FIG. 3 is a view illustrating configuration of an apparatus for controlling stabilization of a satellite-tracking antenna according to the present invention.

Referring to FIG. 3, the apparatus 100 for controlling stabilization of the satellite-tracking antenna according to the present invention includes an antenna driving unit 110, a point detecting unit 120, an elevation measuring unit 130, and a controller 140.

The antenna driving unit 110 drives the antenna to track the satellite based on preset satellite position information and position information collected by the inertia sensor and an encoder that are attached to the antenna.

The antenna driving unit 110 receives satellite signals through the antenna reflection plate, the antenna horn, and RF devices to calculate a satellite-facing direction of the antenna, and drives an azimuth motor and an elevation motor according to the satellite-facing direction.

The point detecting unit 120 detects a point where the amplitude of the satellite reception signal of the antenna is the maximum, while compensating the movement of the platform and the disturbance.

The point detecting unit 120 detects a point where a tracking error is 'zero' according to an angle between a current facing direction of the antenna and a direction where the amplitude of the satellite reception signal is the maximum, as the point where the amplitude of the satellite reception signal of the antenna is the maximum.

The point detecting unit 120 may detect the point where the amplitude of the satellite reception signal of the antenna is the maximum by using a step-tracking algorithm or a mono-pulse algorithm.

More specifically, the step-tracking algorithm is an algorithm for searching for a direction where an amplitude of a satellite reception signal increases in stages by using the amplitude of the satellite reception signal. The algorithm identifies a desired facing direction of the antenna so as to obtain a satellite reception signal having larger amplitude than an amplitude corresponding to a point to which the antenna currently faces.

Also, the mono-pulse algorithm uses a mono-pulse signal indicating an error signal that indicates an angle between a position where the satellite-tracking antenna is currently facing and a position where the satellite-tracking antenna is desired to face. When the satellite-tracking antenna precisely faces the satellite, the mono-pulse signal is 0, thus it is unnecessary to drive the antenna for stabilization control. After, when the satellite-facing direction is changed due to disturbance, etc., a mono-pulse control input is calculated by the changed error to be used as a control input for stabilization control.

The elevation measuring unit 130 measures an elevation value of the antenna at a portion where the amplitude of the satellite reception signal of the antenna is the maximum.

The controller 140 drives motors based on the satellite-facing direction obtained by using the step-tracking algorithm or the mono-pulse algorithm.

That is, when a movement of the satellite is detected after the antenna faces the point where the amplitude of the satellite reception signal is the maximum, the controller 140 uses a value obtained by adding the azimuth value corresponding to the point and an azimuth change value in consequence of the movement of the satellite, as a driving command value for the azimuth motor to drive the azimuth motor, whereby the antenna is controlled to face the point where the amplitude of the satellite reception signal is the maximum.

Also, when a movement of the satellite is detected after the antenna faces the point where the amplitude of the satellite reception signal is the maximum, the controller 140 uses a value obtained by adding the measured elevation value corresponding to the point and an elevation change value in consequence of the movement of the satellite, as a driving command value for the elevation motor to drive the elevation motor, whereby the antenna is controlled to face the point where the amplitude of the satellite reception signal is the maximum.

In this case, only the inertia sensor attached to the reflection plate is required without additional sensor for disturbance. Also, in this way, the driving command is not changed in a case of a stationary satellite.

As described above, in order to maintain the satellite-facing direction by the controller 140, the satellite-facing direction of the antenna is required to be matched with a direction of the satellite. When the platform moves or disturbance occurs or the satellite moves, it is required to generate rotation around axes (Xsc, Ysc, and Zsc axes) defined in the inertia sensor. Thus, when the satellite moves, it is required to generate rotation around axes (Xsc, Ysc, and Zsc axes) defined in the inertia sensor by using the elevation motor and the azimuth motor. Here, when the elevation is 90 degrees, driving axes of the elevation and the azimuth perpendicular to Zsc-axis. Thus, it is impossible to generate rotation around Zsc-axis by driving the elevation motor or the azimuth motor.

Therefore, the controller 140 according to the present invention controls driving commands for the azimuth motor and the elevation motor as follows in order to intentionally prevent the elevation from being 90 degrees.

More specifically, when the measured elevation value of the antenna is out of a first preset range, namely, the elevation value of the antenna is less than 90 degree, the controller 140 controls the azimuth motor and the elevation motor of the antenna to enable the antenna to face the point where the amplitude of the satellite reception signal is the maximum. This is called a simple tracking mode for convenience of explanation. Here, the first preset range is set as 80 degrees to 100 degrees, but without being limited thereto.

Also, when the measured elevation value of the antenna is in the first preset range, namely, the elevation value of the antenna is close to 90 degrees, the controller 140 controls the azimuth motor of the antenna to have an azimuth value corresponding to the point where the amplitude of the satellite reception signal is the maximum. Also, the controller 140 controls the elevation motor of the antenna to have an elevation value less than the measured elevation value corresponding to the point where the amplitude of the satellite reception signal is the maximum. That is, the controller 140 generates driving commands to control the azimuth motor and the elevation motor in order to prevent the keyhole problem that occurs when the elevation is close to 90 degrees. This is called a keyhole prevention mode for convenience of explanation.

When the movement of the satellite is detected after the antenna faces the point where the amplitude of the satellite reception signal is the maximum, and the measured elevation value of the antenna is in the first preset range, and the measured elevation value is larger than a value in a second preset range that is less than 90 degrees and exceeds a value obtained by subtracting a tracking error from 90 degrees, the controller 140 generates the driving command for the elevation motor based on a value obtained by subtracting an integral value for a preset constant value from the value obtained by adding the measured elevation value corresponding to the point and the elevation change value in consequence of the movement of the satellite.

Also, when the movement of the satellite is detected after the antenna faces the point where the amplitude of the satellite reception signal is the maximum, and the measured elevation value of the antenna is in the first preset range, and the measured elevation value is less than a value in a third preset range that is less than the value in the second preset range and exceeds the value obtained by subtracting the tracking error from 90 degrees, the controller 140 generates the driving command for the elevation motor based on a value obtained by subtracting an initial integral value (0) for the preset constant value from the value obtained by adding the measured elevation value corresponding to the point and the elevation change value in consequence of the movement of the satellite.

For example, the time when the measured elevation value of the antenna is larger than the second preset range is designated as t1, and the time when the measured elevation value of the antenna is smaller than the third preset range is designated as t2. When the elevation where the amplitude of the satellite reception signal is the maximum is 90 degrees, the driving, command value for the elevation motor is $90 - \int_{t1}^{t2} Constdt$. Here, the elevation is prevented from being 90 degrees by the value of $-\int_{t1}^{t2} Constdt$. Accordingly, the azimuth can be precisely controlled, and thus a faced point and an angle between a vector and a point where a satellite reception amplitude is the maximum are determined by only an elevation error. Here, the elevation error is $-\int_{t1}^{t2} Constdt$. Here, when $-\int_{t1}^{t2} Constdt$ is less than a value obtained by subtracting a value in the third preset range, which is less than the value in the second preset range and exceeds the value obtained by subtracting the tracking error from 90 degrees, from 90 degrees, the measured elevation value of the antenna is in the first preset range. The possible maximum error is $-\int_{t1}^{t2} Constdt$. Thus, when the value of the third preset range is small, the maximum error is reduced. However, in this case, required azimuth speed increases in proportion to 1/cos (elevation). Therefore, it is desired to set the value of the third preset range as a value that is sufficient to, satisfy the driving torque capability of the motor.

As described above, the reasons for using the integral value without adding a random constant value when intentionally generating the elevation error in the present invention will be disclosed as follows.

The first reason is that the elevation driving command may be prevented from discontinuously changing over time. That is, when the driving command of the elevation motor discontinuously changes over time, the elevation motor may be in an uncontrollable state due to bandwidth limitation. The second reason is that rotation speed of the elevation motor may be increased according to the elevation error, because it is required to quickly stop an increase in the elevation when the elevation is close to 90 degrees.

Also, the second range and the third range are set to be different from each other in the present invention. In a case where the second range and the third range are the same, when the inertia sensor has a noise or the platform moves and disturbance has high-frequency components, switching between the keyhole prevention mode and the simple tracking mode occurs by a high frequency. Thus, when driving the elevation motor, high-frequency components occur, whereby control performance may be reduced. Therefore, by setting the second range and the third range differently, switching between modes caused by noise or small vibrations of disturbance may be prevented.

Figure 4:
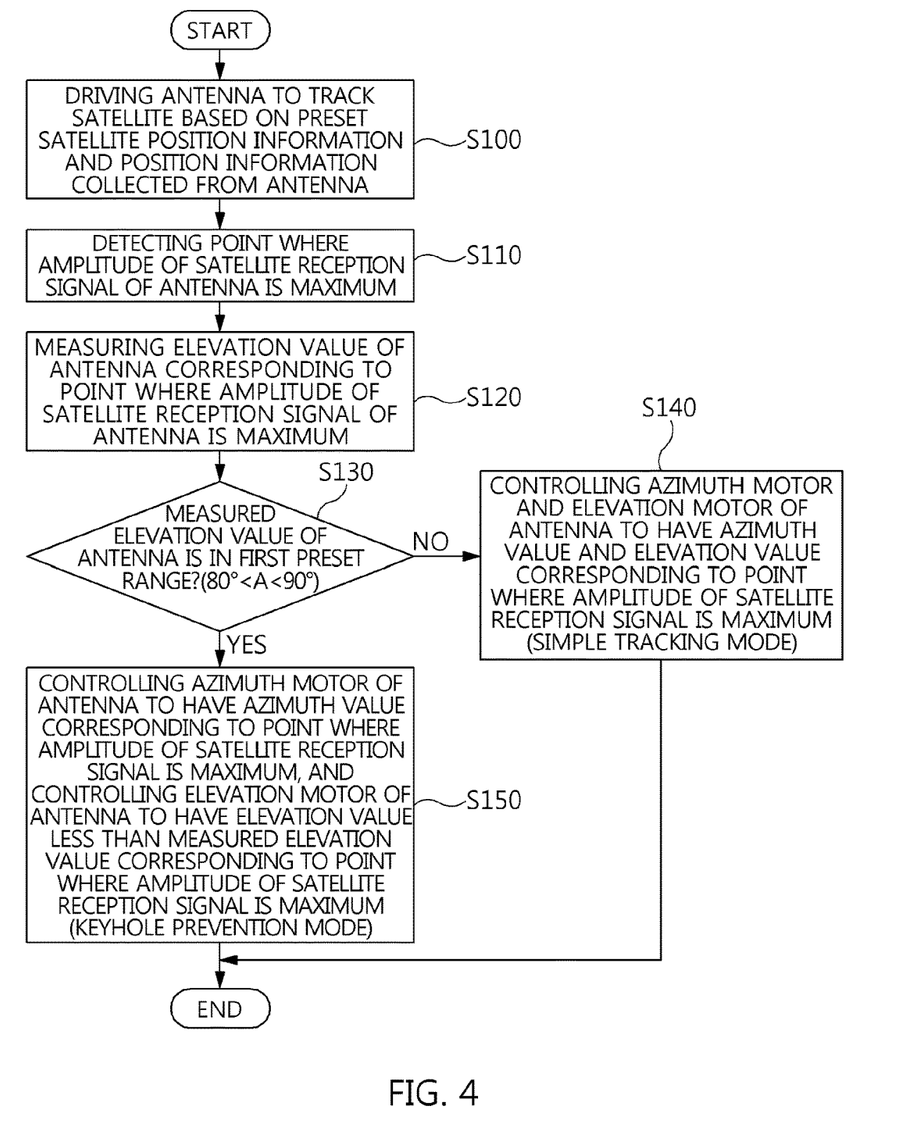
FIG. 4 is a flowchart illustrating a method of controlling stabilization of a satellite-tracking antenna according to the present invention.

FIG. 4 is a flowchart illustrating a method of controlling stabilization of a satellite-tracking antenna, according to the present invention.

Referring to FIG. 4, the method of controlling stabilization of the satellite-tracking antenna according to the present invention is performed by using the above-described apparatus for controlling stabilization of the satellite-tracking antenna, and a repeated description thereof will be omitted.

First, the antenna is driven to track the satellite based on preset satellite position information and position information collected by the inertia sensor and the encoder that are attached to the antenna at step S100. At step S100, satellite signals are received through the antenna reflection plate, the antenna horn, and the RF devices to calculate a satellite-facing direction of the antenna, and the azimuth motor and the elevation motor are driven according to the satellite-facing direction.

Next, the point where the amplitude of the satellite reception signal of the antenna is the maximum is detected at step S110. At step S110, a point where a tracking error is 'zero' according to an angle between a current facing direction of the antenna and a direction where the amplitude of the satellite reception signal is the maximum is detected as the point where the amplitude of the satellite reception signal of the antenna is the maximum.

Next, an elevation value of the antenna is measured corresponding to the point where the amplitude of the satellite reception signal of the antenna is the maximum at step S120.

Next, whether or not the measured elevation value is in the first preset range is determined at step S130.

At step S130, when the measured elevation value of the antenna is out of the first preset range, the azimuth motor and the elevation motor of the antenna are controlled to enable the antenna to face the point where the amplitude of the satellite reception signal is the maximum at step S140. Step S140 is called a simple tracking mode in the present invention.

At step S130, when the measured elevation value of the antenna is in the first preset range, the azimuth motor of the antenna is controlled to have an azimuth value corresponding to the point where the amplitude of the satellite reception signal is the maximum. The elevation motor of the antenna is controlled to have an elevation value less than the measured elevation value corresponding to the point where the amplitude of the satellite reception signal is the maximum at step S150. Step S150 is called a keyhole prevention mode in the present invention.

Figure 5:
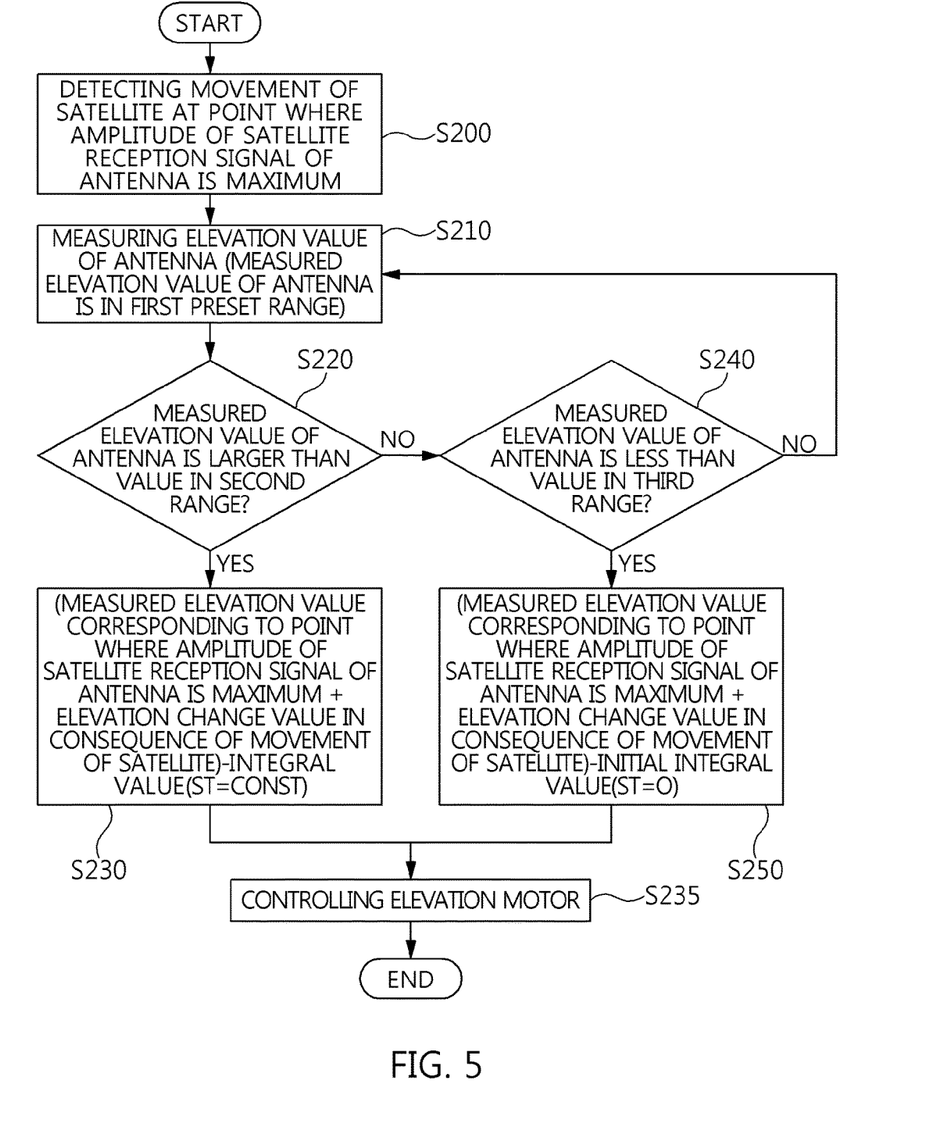
FIG. 5 is a flowchart illustrating a process of controlling an azimuth motor and an elevation motor according to a keyhole prevention mode in the method of controlling stabilization of a satellite-tracking antenna according to the present invention.

FIG. 5 is a flowchart illustrating a process of controlling the azimuth motor and the elevation motor according to a keyhole prevention mode in the method of controlling stabilization of the satellite-tracking antenna according to the present invention.

Referring to FIG. 5, the process of controlling the azimuth motor and the elevation motor according to the keyhole prevention mode of the present invention will be described as follows.

Here, in the keyhole prevention mode, when the measured elevation value of the antenna is in the first preset range, namely, when the measured elevation value is close to 90 degrees, the azimuth motor of the antenna is controlled to have an azimuth value corresponding to the point where the amplitude of the satellite reception signal is the maximum. Also, the elevation motor of the antenna is controlled to have an elevation value less than the measured elevation value corresponding to the point where the amplitude of the satellite reception signal is the maximum.

First, the antenna faces the point where the amplitude of the satellite reception signal is the maximum, and then the movement of the satellite is detected at step S200.

Next, the elevation value of the antenna is measured at step S210. At step S210, when the measured elevation value of the antenna is in the first preset range, the following steps proceed.

Next, when the measured elevation value of the antenna is in the first preset range, whether or not the measured elevation value is larger than a value in a second preset range that is less than 90 degrees and exceeds a value obtained by subtracting a tracking error from 90 degrees is determined at step S220.

At step S220, when the measured elevation value of the antenna is in the first preset range and is larger than the value in the second preset range, a driving command signal for the elevation motor is generated based on a value obtained by subtracting an integral value for a preset constant value from a value obtained by adding the measured elevation value corresponding to the point and an elevation change value in consequence of the movement of the satellite at step S230.

Based on the driving command signal for the elevation motor generated at step S230, the elevation motor is controlled at step S235.

In the meantime, at step S220, when the measured elevation value of the antenna is in the first preset range and is out of the second preset range, whether or not the measured elevation value is less than a value in a third preset range that is less than the value in the second preset range and exceeds the value obtained by subtracting the tracking error from 90 degrees is determined at step S240.

At step S240, when the measured elevation value of the antenna is in the first preset range and is in the third preset range, a driving command signal for the elevation motor is generated based on a value obtained by subtracting an initial integral value for the preset constant value from the value obtained by adding the measured elevation value corresponding to the point and the elevation change value in consequence of the movement of the satellite at step S250.

Based on the driving command signal for the elevation motor generated at step S250, the elevation motor is controlled at step S235.

In the meantime, at step S240, when the measured elevation value of the antenna is in the first preset range and is out of the third preset range, an elevation value of the antenna is measured again at step S200.

As described above, in order to obtain the point where the satellite reception signal is the maximum, the apparatus and method for controlling stabilization of the satellite-tracking antenna according to the present invention extract an antenna position and a faced point by searching for the point where the amplitude of the satellite reception signal is the maximum, and control the azimuth motor and the elevation motor to correct an antenna position based on the extracted antenna position and faced point, whereby communication quality of satellite communication can be ensured regardless of the movement of the platform and disturbance.

Also, the apparatus and method for controlling stabilization of the satellite-tracking antenna can adjust an azimuth value of the azimuth motor to be an azimuth value corresponding to the point where the amplitude of the satellite reception signal is the maximum and can adjust a measured elevation value of the elevation motor to be less than an elevation value corresponding to the point where the amplitude of the satellite reception signal is the maximum when the measured elevation value of the antenna is equal to or greater than a preset angle through the encoder, whereby keyhole problem can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling stabilization of a satellite-tracking antenna, the apparatus comprising:
   an antenna driving unit driving the antenna to track a satellite based on preset satellite position information and position information collected by an inertia sensor and an encoder that are provided at the antenna;
   a point detecting unit detecting a point where an amplitude of a satellite reception signal of the antenna is maximum;
   an elevation measuring unit measuring an elevation value of the antenna corresponding to the point where the amplitude of the satellite reception signal of the antenna is maximum; and
   a controller controlling an azimuth motor and an elevation motor of the antenna to enable the antenna to face the point where the amplitude of the satellite reception signal is maximum, when the measured elevation value of the antenna is out of a first preset range,
   the controller controlling the azimuth motor of the antenna to have an azimuth value corresponding to the point where the amplitude of the satellite reception signal is maximum and controlling the elevation motor of the antenna to have an elevation value less than the measured elevation value corresponding to the point where the amplitude of the satellite reception signal is maximum, when the measured elevation value of the antenna is in the first preset range, wherein when a movement of the satellite is detected after the antenna faces the point where the amplitude of the satellite reception signal is maximum, the controller generates a driving command signal for the elevation motor based on a value obtained by adding an elevation change value in consequence of the movement of the satellite to the measured elevation value corresponding to the point.

2. The apparatus of claim 1, wherein the point detecting unit detects the point where the amplitude of the satellite reception signal of the antenna is maximum, and the point is a point where a tracking error is 'zero' according to an angle between a current facing direction of the antenna and a direction where the amplitude of the satellite reception signal is maximum.

3. The apparatus of claim 1, wherein when a movement of the satellite is detected after the antenna faces the point where the amplitude of the satellite reception signal is maximum, the controller generates a driving command signal for the azimuth motor based on a value obtained by adding an azimuth change value in consequence of the movement of the satellite to the azimuth value corresponding to the point.

4. The apparatus of claim 1, wherein when the movement of the satellite is detected after the antenna faces the point where the amplitude of the satellite reception signal is maximum, and the measured elevation value of the antenna is in the first preset range, and the measured elevation value is larger than a value in a second preset range that is less than 90 degrees and exceeds a value obtained by subtracting a tracking error from 90 degrees, the controller generates the driving command signal for the elevation motor based on a value obtained by subtracting an integral value for a preset constant value from the value obtained by adding the elevation change value in consequence of the movement of the satellite to the measured elevation value corresponding to the point.

5. The apparatus of claim 4, wherein when the movement of the satellite is detected after the antenna faces the point where the amplitude of the satellite reception signal is maximum, and the measured elevation value of the antenna is in the first preset range, and the measured elevation value is less than a value in a third preset range that is less than the value in the second preset range and exceeds the value obtained by subtracting the tracking error from 90 degrees, the controller generates the driving command signal for the elevation motor based on a value obtained by subtracting an initial integral value for the preset constant value from the value obtained by adding the elevation change value in consequence of the movement of the satellite to the measured elevation value corresponding to the point.

6. A method of controlling stabilization of a satellite-tracking antenna, the method comprising:
    driving, by an antenna driving unit, the antenna to track a satellite based on preset satellite position information and position information collected by an inertia sensor and an encoder that are provided at the antenna;
    detecting, by a point detecting unit, a point where an amplitude of a satellite reception signal of the antenna is maximum;
    measuring, by an elevation measuring unit, an elevation value of the antenna corresponding to the point where the amplitude of the satellite reception signal of the antenna is maximum;
    controlling, by a controller, an azimuth motor and an elevation motor of the antenna to enable the antenna to face the point where the amplitude of the satellite reception signal is maximum, when the measured elevation value of the antenna is out of a first preset range; and
    controlling, by the controller, the azimuth motor of the antenna to have an azimuth value corresponding to the point where the amplitude of the satellite reception signal is maximum, and controlling the elevation motor of the antenna to have an elevation value less than the measured elevation value corresponding to the point where the amplitude of the satellite reception signal is maximum, when the measured elevation value of the antenna is in the first preset range, wherein when a movement of the satellite is detected after the antenna faces the point where the amplitude of the satellite reception signal is maximum, the controller generates a driving command signal for the elevation motor based on a value obtained by adding an elevation change value in consequence of the movement of the satellite to the measured elevation value corresponding to the point.

* * * * *